NONDESTRUCTIVE READ MAGNETIC FILM MEMORY

Filed Aug. 7, 1962 2 Sheets-Sheet 1

INVENTORS A.H. BOBECK
J.L. SMITH
BY John F Powell
ATTORNEY

INVENTORS A. H. BOBECK
J. L. SMITH
BY John F Powell
ATTORNEY

United States Patent Office 3,290,662
Patented Dec. 6, 1966

3,290,662
NONDESTRUCTIVE READ MAGNETIC FILM MEMORY

Andrew H. Bobeck, Chatham, and James L. Smith, Bedminster, N.J., assignors to Bell Telephone Laboratories, Incorporated, New York, N.Y., a corporation of New York Filed Aug. 7, 1962, Ser. No. 215,447
10 Claims. (Cl. 340—174)

This invention relates to information storage arrangements and more particularly to such arrangements in which information stored in the form of remanent flux states of magnetic memory elements may be nondestructively interrogated.

Magnetic information storage arrangements employing magnetic memory elements as information storage addresses are well known in the information handling and processing art. The substantially rectangular hysteresis characteristics of the magnetic materials of which such memory elements are fabricated enable the elements to store binary values by being magnetized in either of two remanent flux states. The well known toroidal magnetic core, for example, has one binary value associated with one of the remanent states and the other binary value with the other of the remanent states. Which of the binary values is stored in the core at any given time is determined by applying a read out current pulse to a winding inductively coupled to the core. Should a reversal of the magnetic flux from one of its remanent states to the other remanent state occur as a result of the applied read out current pulse, a voltage will be induced across a sensing winding also inductively coupled to the core, which voltage will be indicative of a particular binary value.

Patent 2,825,891 of S. Duinker, issued March 4, 1958, discloses an information storage arrangement in which the input and read out current pulses utilize considerably less power and may recur more frequently than in toroidal core memory circuits. The circuit includes a high magnetic permeability base plate having narrow recesses therein, conductors positioned in the recesses and magnetic material having substantially rectangular hysteresis characteristics bridging the recesses.

A severe limitation of the circuit disclosed in the Duinker patent results, however, because of noise problems inherent therein. Thus, whenever a signal is applied to any conductor of this circuit, noise signals are generated in all other conductors of the circuit which at any point are closely parallel to or which nonorthogonally intersect this conductor within any of the recesses. The noise signals result from the close inductive coupling which exists between these conductors due to the high permeability magnetic base plate which almost completely surrounds them. A substantial signal-to-noise problem inevitably accompanies the use of this circuit.

Accordingly, it is an object of this invention to provide a magnetic memory circuit in which the signal-to-noise disadvantage of the circuit of the Duinker patent is eliminated, while the advantages possessed by this circuit are maintained.

It is another object of this invention to provide a new and novel memory circuit in which nondestructive interrogation is achieved.

To above and other objects are realized in one embodiment of a memory array according to the principles of this invention which comprises a high magnetic permability base plate having a plurality of posts formed thereon and a sheet of magnetic material having a substantially rectangular hysteresis characteristic positioned across the tops of the posts. A magnetic cell is defined in the array by four linearly arranged ones of the posts, the inner pair being relatively narrow and positioned close together and the outer pair being relatively wide and far apart.

The inner pair of posts is utilized to interrogate nondestructively information stored by means of remanent magnetization within a flux path defined by the outer pair of posts, the magnetic sheet and the portion of the base plate between the outer posts. The mode of nondestructive interrogation utilized is similar to that described in the copending application of A. H. Bobeck, Serial No. 752,905, filed August 4, 1958, now Patent 3,090,946, issued May 21, 1963, which may be considered incorporated herein by reference. In this copending application, a binary information value stored in a magnetic wire memory element is stored in three adjacent segments of the element. As described therein each segment is of less than a minimum dimension in length and is thereby rendered magnetically unstable. All three segments are in one or the other condition of remanent magnetization depending upon the particular binary value stored therein. The stored information is interrogated by the application of a read out signal to a winding coupled to the center segment only. If a binary "1" is stored in the segments, the remanent magnetization of the center segment is reversed thereby inducing an output signal in an output winding also coupled to the center segment. Upon the termination of the read out signal no further power need be applied to restore the center segment to its previous magnetic state. The magnetic interaction of the magnetic flux of the two end segments restores the center segment to its previous magentic state representative of a binary "1."

In the present invention the particular condition of remanent magnetization existing in a flux path extending between the outer posts is nondestructively interrogated by means of the inner posts. A read out signal applied to a conductor positioned between the two inner posts effects, for one polarity of remanent magnetization between the outer posts, a reversal of magnetization in that portion of the overlay magentic sheet between the two inner posts. An output signal is thereby induced in a sense winding also positioned between the two inner posts. Upon termination of the read out signal, magnetic interaction of the magnetic flux in the two portions of the memory cell between the inner posts and the two outer posts upon the portion between the inner posts restores the latter portion to its previous remanent magnetic condition.

The two inner posts may advantageously be of a shorter height than the outer posts thereby providing an air gap between the inner posts and the square loop overlay material; the effect of such an air gap may alternatively be provided by inserting a low permeability spacer material between the inner posts and the overlay material. The effect of the air gap is to provide a demagnetizing field on the magnetic circuit including the two inner posts and the overlay material. The inner posts are also of a relatively narrow cross section thereby increasing the flux density within the air gap of flux passing between the inner posts and the overlay material via the air gap. The magnetic flux following paths within the outer posts and portions of the overlay material between an outer post and one of the inner posts also has a demagnetizing effect on flux caused by a read out signal to follow a path within the two inner posts and the portion of the overlay material therebetween. Additionally, the two inner posts are positioned relatively close together thereby rendering magnetically unstable the portion of the square loop overlay material therebetween. Each of the preceding features contributes to the restoration of the flux pattern of the memory cell to its previous condition following application of a read out signal. For particular embodiments of this invention all of these features will not be necessary. Thus, such determinations as the length of the air gap and the spacing of the inner posts may be established experimentally for the particular materials utilized. A particular configuration which was operated according to the principles of this invention utilized inner posts 7 mils in width, outer posts 30 mils in width, the inner posts positioned 7 mils apart and each outer post positioned 30 mils from its adjacent inner post. The overlay material was permalloy having a thickness of ⅓ mil and a coercive force of 3.7 oersted. The inner and outer posts were both 20 mils in height and the base plate was of a high permeability ferrite. It was found that a low permeability spacing material between the inner posts and the overlay material was not needed.

Information may advantageously be stored on a word organized basis in a memory array having a plurality of such four post memory cells arranged in rows and columns on a single high magnetic permeability base plate. A single sheet of magnetic material having substantially rectangular hysteresis characteristics is positioned across the tops of the posts. A bit address is defined by two adjacent memory cells aligned in a single row and each row of bit addresses is adapted to store a binary word. Word conductors are associated with respective rows of the posts, each conductor passing in the same sense between each inner post and its adjacent outer post of each memory cell in its associated row. A bit conductor also passes between each inner post and its adjacent outer post of both memory cells of each bit address; in one cell, however, it passes between these posts in the same sense as does the word conductor and in the other cell passes between the posts in a sense opposite from that of the word conductor. Each bit conductor, moreover, passes between the posts of only one bit address in each row; it does, however, pass between the posts of corresponding addresses of each of the rows. Interrogating conductors associated with respective rows pass between the inner posts of each cell of their associated rows. Sensing conductors also pass between the inner posts of the cells, in one cell of each address passing in the same sense as the interrogating conductor and in the other cell passing in a sense opposite from that of the interrogating conductor. Like the bit conductors, each sensing conductor passes between the posts of only one bit address in each row and between the posts of corresponding addresses of each of the rows.

Information is stored in the bit addresses comprising a single word by applying simultaneous input signals to a selected word conductor and to each of the bit conductors, the particular binary value stored in each bit address being determined by the polarity of the signal applied to its associated bit conductor. The input signals applied to the word and bit conductors are of a magnitude such that their sum produces a magnetizing force which exceeds the coercive force of the overlay magnetic material between the outer posts of a memory cell while their difference produces a magnetizing force less than the coercive force. One cell of each bit address of the addresses comprising the selected word location is thereby switched from a previous remanent magnetic condition uniform to all of the cells to the opposite remanent condition. Interrogation is achieved by the application of a read out signal to the interrogating conductor associated with the addresses of the selected location thereby effecting a temporary flux reversal, as discussed hereinbefore, between the inner posts of one cell of each of the addresses. Signals induced in the sensing conductors during interrogation are detected, their polarities manifesting the information stored in respective addresses of the interrogated word.

The noise problems of the circuit described in the Duinker patent, previously referred to, are greatly diminished by cancellation during the interrogating phase of operation of noise signals induced in the sense conductors. In each address interrogated, noise signals induced in the sense conductor, by a signal applied to the interrogating conductor, are of opposite polarity in the two cells of the address and cancel. The signal induced in the sense conductor by temporary flux switching in the square loop overlay material between the inner posts of one of the cells is not cancelled, because of an absence of a corresponding signal in the other cell, and its polarity is indicative of the binary value stored in the address.

Thus, according to one feature of this invention a magnetic memory array utilizing a high magnetic permeability base plate having a plurality of posts extending therefrom and a square loop material positioned across the posts to form a plurality of magnetic cells has a pair of posts within each cell positioned sufficiently close together to define a region of the square loop material which exhibits magnetic instability.

According to another feature of this invention a magnetic memory array utilizing a high magnetic permeability base plate having a plurality of posts extending therefrom and a square loop material positioned across the posts to form a plurality of magnetic cells has each cell defined therein by four linearly aligned posts, the inner posts being narrower than the outer posts and positioned relatively close together.

A more complete understanding of this invention and of the above and other objects and features thereof may be gained from a consideration of the following detailed description together with the accompanying drawings, in which.

Figure 1:
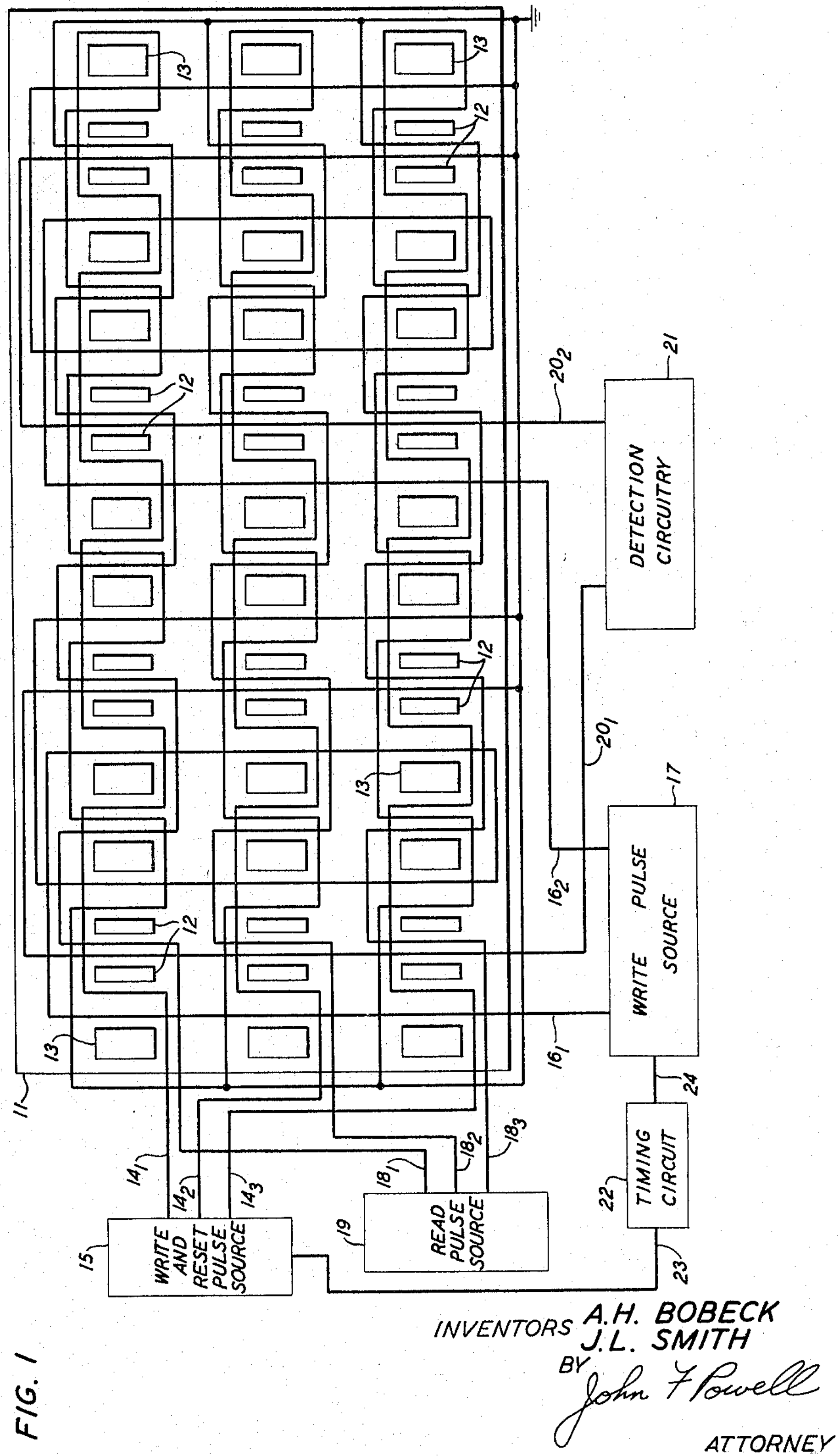
FIG. 1 depicts one specific embodiment of a memory array according to the principles of this invention.

A specific embodiment of a memory array according to this invention is shown in FIG. 1. A high magnetic permeability base plate 11 is shown having a plurality of posts extending therefrom which are arranged in rows and columns. Each row of posts includes four pairs of relatively narrow posts 12, the posts 12 of each pair being positioned close together. Each row also includes four pairs of relatively wide posts 13, the posts 13 of each pair having one of the pairs of posts 12 positioned therebetween. Each group of four posts comprising a pair of posts 13 having a pair of posts 12 therebetween defines a memory cell on plate 11 and a bit address is defined by adjacent memory cells in a single row. Thus each of the three rows of posts 12 and 13 of FIG. 1 includes two bit addresses.

Word conductors $\mathbf{14}_1$ through $\mathbf{14}_3$ are positioned between the posts 12 and 13 of respective ones of the three rows and are conencted between ground potential and pulse source 15. As shown in FIG. 1, the conductors 14 pass in the same sense between each post 13 and its adjacent post 12. Thus, as viewed in FIG. 1, a positive signal passing from source 15 to ground will pass in an upward direction between each post 13 and its adjacent post 12. Bit conductors $\mathbf{16}_1$ and $\mathbf{16}_2$ each pass between the posts 12 and 13 of one bit address of each of the rows of addresses and are connected between ground potential and pulse source 17. In each bit address, the conductor 16 associated therewith passes in one sense between both pairs of adjacent posts 12 and 13 of one cell and in the opposite sense between both pairs of adjacent posts 12 and 13 of the other cell. Thus, as viewed in FIG. 1, a positive signal passing from source 17 to ground will pass in an upward direction between each post 13 and its adjacent post 12 of the left hand cell of each of its associated addresses and in a downward direction between each post 13 and its adjacent post 12 of the right hand cell of each of its associated addresses.

Interrogating conductors $\mathbf{18}_1$ through $\mathbf{18}_3$ are positioned between each pair of posts 12 of respective ones of the rows and are connected between ground potential and pulse source 19. Each conductor 18 passes in the same sense between all of the pairs of posts 12 of its associated row. Finally, sensing conductors $20_1$ and $20_2$ each pass between the pairs of posts 12 of one bit address of each of the rows and are connected between ground potential and detection circuitry 21. Each conductor 20 passes in one sense between the posts 12 of one cell and in the opposite sense between the posts 12 of the other cell of each of its associated bit addresses. Timing circuit 22 is connected to sources 15 and 17 by conductors 23 and 24, respectively.

The pulse source 15 shown in FIG. 1 in block diagram form may comprise any well known circuitry capable of providing write and reset pulses of the character described hereinafter. Similarly, pulse sources 17 and 19 also shown in block diagram form may comprise well known circuits capable of providing write and read signals, respectively, of the character described hereinafter. Timing circuit 22 is also shown in block diagram form and may comprise circuitry capable of timing the energization of sources 15 and 17 in the manner described hereinafter, during the write phase of operation. Detection circuitry 21 is also shown in block diagram form and may comprise well known circuitry capable of detecting signals induced in conductors 20 during the read phase of operation.

Figure 2A:
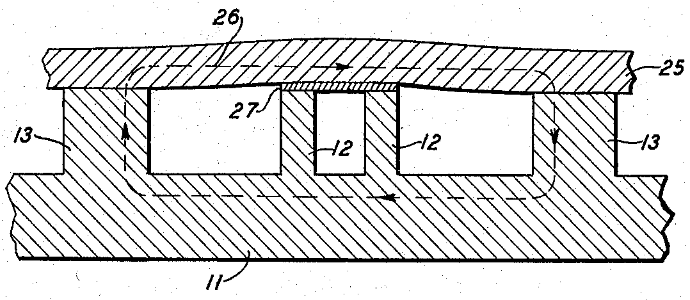
FIG. 2A depicts the state of magnetization in an illustrative memory cell of the array of FIG. 1 at one stage of its operation.
Figure 2B:
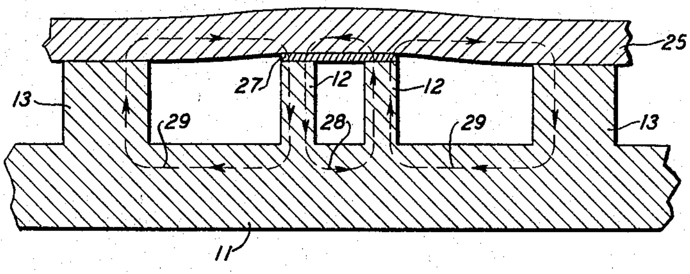
FIG. 2B depicts the state of magnetization in the illustrative memory cell of the array of FIG. 1 at another stage of its operation.

FIGS. 2A and 2B depict, in a cutaway side view, an illustrative memory cell of the array of FIG. 1, showing the flux patterns therein prior to and during interrogation, respectively, for one polarity of remanent magnetization established between the posts 13. A sheet of flexible magnetic material 25 having substantially rectangular hysteresis characteristics is positioned across the top of the posts 12 and 13 as shown in FIGS. 2A and 2B. The sheet is positioned across all of the posts 12 and 13 of the plate 11 but for illustrative purposes is not shown in FIG. 1. The sheet 25 is advantageously clamped tightly against the posts 13 in order to minimize the total reluctance of magnetic paths which include the posts 13, sheet 25, and base 11. Such clamping may be achieved, for example, by means of a metallic pressure plate above the sheet 25 and clamping screws passing between the pressure plate and base 11; such pressure plate and clamping screws, however, are for illustrative purposes not shown in the drawing.

FIG. 2A depicts a particular remanent magnetic state in an illustrative memory cell of the array of FIG. 1. Magnetic flux follows a clockwise path in plate 11, posts 13 and sheet 25, as viewed in FIG. 2A, and is represented by closed line 26. A low permeability spacing material 27 is affixed to the posts 12 and serves to increase the magnetic reluctance of flux paths including the posts 12, sheet 25, plate 11 and spacing material 27. Also for illustrative purposes, the spacing material 27 is not shown in FIG. 1.

During interrogation, a read out signal applied to an interrogating conductor 18 passing between the posts 12 of the illustrative memory cell of FIGS. 2A and 2B effects a reversal of flux in the portion of the sheet 25 between these posts. This flux closes in a counterclockwise direction through the spacing material 27, the posts 12 and plate 11 as depicted in FIG. 2B by closed line 28. Closed lines 29 represent resulting flux patterns in which flux follows a clockwise direction, as viewed in FIG. 2B, between each post 13, its adjacent post 12, sheet 25, spacing material 27, and plate 11. Upon the termination of the read out signal no further energy need be supplied to the illustrative cell to cause the flux pattern depicted in FIG. 2B to revert to that depicted in FIG. 2A. The flux path 28 is rendered magnetically unstable as a result of the close positioning of the posts 12 and the increase in the reluctance of the path caused by spacing material 27. Upon the termination of the read out signal the magnetic flux represented by closed lines 28 and 29 interact in such a manner that the flux pattern depicted in FIG. 2A is reestablished. The interrogating conductor 18 and other conductors associated with the illustrative memory cell of FIGS. 2A and 2B are, for illustrative purposes, not shown in these figures.

The flux patterns represented by the paths 26, 28, and 29 represent a convenient means for describing the flux conditions manifested within an illustrative memory cell of the present invention. It is recognized, however, that the flux patterns actually existing within the cell during its operation may be considerably more complex than those depicted herein. However, it is known that the flux patterns effected by the read out signal interact, upon the termination of the signal, to restore the flux pattern within the cell to the condition existing therein prior to the application of the read out signal and that the cell may repeatedly be thus nondestructively interrogated.

The array of FIG. 1 is of the word-organized type. That is, a binary word is associated with each of the word conductors 14. Similarly, a binary word is associated with each of the interrogating conductors 18. During read out a particular binary word is interrogated by applying a read out signal from source 19 to a particular one of the conductors 18. As a result, one memory cell of each bit address associated with the particular conductor 18 undergoes a temporary flux reversal, as described hereinbefore, and output signals are induced in each of the sense conductors $20_1$ and $20_2$, the polarity of which are indicative of the binary values stored in each of these bit addresses. Bearing in mind the foregoing organization, a detailed description of the operation of this circuit will now be set forth.

Prior to the storage of a binary word in particular ones of the addresses, these addresses must be in a magnetic condition which renders them receptive to information signals. This is achieved by the application of negative polarity reset signals from source 15 to particular ones of the word conductors 14. These signals establish a uniform remanent magnetic condition, which may be designated a reset condition, in each cell associated with the particular conductors 14. The reset condition is manifested by a remanent magnetization directed to the left in the overlay magnetic sheet positioned above the posts 12 and 13, as viewed in FIG. 1; as stated previously, the magnetic overlay sheet 25 depicted in FIGS. 2A and 2B is, for illustrative purposes, not shown in FIG. 1.

Information is stored in the bit addresses of a particular row of the array by the simultaneous application of a positive write signal from source 15 to the word conductor 14 associated with the particular row and write signals of predetermined polarity from source 17 to each of the bit conductors 16. The polarities of the signals applied to the bit conductors determine the particular binary values written into the addreses. The signals applied to the bit conductor produce a magnetomotive force which in one cell of each address aids the magnetomotive force effected by the write signal applied to the word conductor while in the other cell of each address it opposes this magnetomotive force. The write signals are chosen to be of magnitudes such that their resultant magnetomotive force is sufficient to reverse the remanent magnetization in a particular memory cell to which they are applied from the reset condition to a condition of opposite remanent magnetization when their individual magnetomotive forces are additive but is insufficient to cause such a reversal when they are subtractive. This condition of opposite remanent magnetization may be designated a set condition and is manifested by a remanent magnetization directed to the right in the overlay magnetic sheet positioned above the posts 12 and 13. Thus as a result of the applied write signals each bit address of the particular row will have one of its cells in the set condition while the other cell remains in the reset condition; the binary values stored in the addresses are determined by which of their cells is driven to the set condition.

Information stored in a particular row of addresses is interrogated by the application of a negative polarity read out signal from source 19 to the particular one of the interrogating windings 18 associated with the particular row. The read out signal is of a magnitude sufficient to effect a temporary flux reversal, as described hereinbefore, in that portion of the magnetic overlay sheet between the posts 12 of each cell associated with the particular winding 18. This flux reversal induces output signals in each of the sensing conductors 20, the polarities of which are indicative of the interrogated information.

Thus, for example, if each address associated with word conductor $14_1$ is in the reset condition as a result of a previously applied reset signal, the binary word 10 may be written into these addresses by the simultaneous application of positive write signals to word conductor $14_1$ and bit conductor $16_1$ and a negative write signal to bit conductor $16_2$. As a result of the applied write signals the bit address defined by conductors $14_1$ and $16_1$ will have its left hand cell, as viewed in FIG. 1, in the set condition and its right hand cell in the reset condition while the address defined by conductors $14_1$ and $16_2$ will have its left hand cell in the reset condition and its right hand cell in the set condition. A subsequent read out signal applied to interrogating conductor $18_1$ will effect a temporary flux reversal, as described hereinbefore, in the two cells in the set condition thereby inducing a positive output signal in sensing conductor $20_1$ and a negative output signal in sensing conductor $20_2$. The output signals are detected by detection circuitry 21 and indicate by their polarities that binary word 10 is stored in the interrogated addresses. Since the flux reversals effected in the addresses by the read out signal are only temporary, the addresses may be repeatedly interrogated without loss of the information stored therein.

The embodiment of the invention just described represents a variation of circuitry described in a copending application by the present inventors, Serial No. 215,318, which is being filed on even date herewith and is to be considered incorporated by reference herein.

It is to be further understood that the specific embodiment of this invention described herein is merely illustrative and that numerous other arrangements according to the principles of this invention may be devised by one skilled in the art without departing from the spirit and scope of this invention. For example, it is clear from the foregoing description that the posts 12 shown in FIGS. 2A and 2B provide means for switching flux in an unstable portion of the overlay sheet 25. Other means such as a single additional post closely spaced apart less than a minimal distance from post 13 may be employed to this end.

What is claimed is:

1. A magnetic memory circuit comprising a high magnetic permeability base plate having a bottom portion and a plurality of posts extending from said bottom portion, an overlay magnetic sheet having substantially rectangular hysteresis characteristics positioned over said posts, a first, second, third and fourth of said posts being linearly aligned on said plate with said second and third posts positioned closely adjacent one another and between said first and fourth posts, a memory cell being defined by said four posts, said overlay material and said base plate; means for establishing a first remanent magnetic condition in the portion of said overlay sheet above all four of said posts representative of one binary value stored in said cell and for establishing a second remanent magnetic condition in the portion of said sheet above all four of said posts representative of another binary value stored in said cell, means for reestablishing said first remanent magnetic condition in only the portion of said sheet above said second and third posts, and means for detecting magnetic flux switching in said portion of the overlay sheet between said second and third posts.

2. A magnetic memory circuit comprising a high magnetic permeability base plate having a bottom portion and a plurality of posts extending from said bottom portion, an overlay magnetic sheet having substantially rectangular hysteresis characteristics positioned over said posts, a first and second pair of said posts linearly aligned on said plate with said second pair of posts positioned between the posts of said first pair, a third and fourth pair of said posts linearly aligned on said plate with said fourth pair of posts positioned between the posts of said third pair; a bit address being defined by said first and second pairs of posts, said third and fourth pairs of posts, said overlay sheet and said base plate; means for establishing a first remanent magnetic condition in the portion of said overlay sheet between said first pair of posts and a second remanent magnetic condition in the portion of said overlay sheet between said third pair of posts representative of a first binary value and for establishing said second remanent condition in the portion of said sheet between said first pair of posts and said first remanent condition in the portion of said sheet between said third pair of posts representative of a second binary value, and means for nondestructively determining which of said first and second binary values is stored in said bit address.

3. A magnetic memory circuit according to claim 2 in which said first, second, third and fourth pairs of posts are all linearly aligned on said base plate.

4. A magnetic memory circuit according to claim 3 in which said means for establishing first and second remanent conditions comprises a first and a second conductor passing between the posts of said first pair of posts and between the posts of said third pair of posts, said second conductor passing between the posts of said first pair in the same sense as said first conductor and between the posts of said third pair in a sense opposite from that of said first conductor, and means for applying input signals of predetermined polarities simultaneously to said first and second conductors.

5. A magnetic memory circuit according to claim 4 in which said means for determining which binary value is stored in said address comprises a third and a fourth conductor passing between the posts of said second pair of posts and between the posts of said fourth pairs of posts, said fourth conductor passing between the posts of said second pair in the same sense as said third conductor and between the posts of said fourth pair in a sense opposite from that of said third conductor, means for applying a read out signal of predetermined polarity to said third conductor, and means for determining the polarity of an output signal induced in said fourth conductor responsive to said read out signal.

6. A magnetic memory circuit comprising a high magnetic permeability base plate having a bottom portion and a plurality of posts extending from said bottom portion, said posts being arranged in rows and columns on said plate, an overlay magnetic sheet having substantially rectangular hysteresis characteristics positioned over said posts, each row of said posts together with said overlay sheet and said base plate defining a plurality of bit addresses, each of said bit addresses including a first and a second group of four posts, a word conductor associated with each row of said posts, each conductor passing between the first and second posts and between the third and fourth posts of each group of posts of its associated row, each bit address having a bit conductor associated therewith which passes between the first and second posts and third and fourth posts of one of its groups of posts in the same sense as does its associated word conductor and between the first and second posts and third and fourth posts of its other group of posts in a sense opposite from that of its associated word conductor, each of said bit conductors being associated with one bit address of each of said rows of posts, an interrogating conductor associated with each row of said posts, each of said interrogating conductors passing between the second and third posts of each group of posts of its associated row, each bit address also having a sensing conductor associated therewith which passes between the second and third posts of one of its groups of posts in the same sense as does its associated interrogating conductor and between the second and third posts of its other group of posts in a sense opposite from that of its associated interrogating conductor, each of said bit conductors being associated with one bit address of each of said rows of posts, means for simultaneously applying input signals of predetermined polarities to a selected one of said word conductors and to each of said bit conductors, means for applying a read out signal to a selected one of said interrogating conductors, and means for detecting signals induced in said sensing conductors.

7. A magnetic memory circuit comprising a high magnetic permeability base plate having a bottom portion and a plurality of posts extending therefrom, an overlay magnetic sheet having substantially rectangular hysteresis characteristics positioned over said posts, means for establishing a first remanent condition in said overlay sheet between a pair of said posts, means defining an unstable portion of said overlay between said pair of posts, means for establishing a second remanent condition in said unstable portion of said overlay between said pair of posts, and means for detecting magnetic flux switching in said unstable portion of said overlay.

8. A magnetic memory in accordance with claim 7 wherein said means defining said unstable portion of said overlay comprises an additional post.

9. A magnetic memory circuit comprising a high magnetic permeability base plate having a bottom portion and a plurality of posts extending therefrom, an overlay magnetic sheet having substantially rectangular hysteresis characteristics positioned over said posts, means for establishing a first remanent condition in said overlay sheet between a first pair of said posts, means comprising a second pair of said posts linearly aligned with said first pair of posts on said base plate for defining an unstable portion of said overlay between said first pair of posts, means for establishing a second remanent condition in said unstable portion of said overlay sheet between said second pair of posts, and means for detecting magnetic flux switching in said unstable portion of said overlay.

10. A magnetic memory circuit in accordance with claim 9 wherein said posts of said second pair are positioned less than a minimal distance apart such that a flux path embraced by said second pair of posts, said overlay sheet, and said base plate are rendered magnetically unstable, said minimal distance being defined as that distance at which said flux path becomes unstable.

References Cited by the Examiner

UNITED STATES PATENTS

| | | | |
|---|---|---|---|
| 2,825,891 | 3/1958 | Duinker | 340—174 |
| 3,219,985 | 11/1965 | MacIntyre | 340—174 |

OTHER REFERENCES

Publication I, "Biak High Speed Magnetic Computer Element," C. L. Wanlass & S. D. Wanlass, I.R.E.—Wescon Convention Record, vol. 3, part 4, August 31, 1959, pp. 40–54.

BERNARD KONICK, *Primary Examiner.*

M. S. GITTES, *Assistant Examiner.*